US011277754B2

(12) United States Patent
Welch et al.

(10) Patent No.: US 11,277,754 B2
(45) Date of Patent: Mar. 15, 2022

(54) ACCESS POINT FOR MANAGING WIRELESS ACCESS TO A NETWORK ACCORDING TO A ZONE OF OPERATION ABOUT THE ACCESS POINT

(71) Applicant: Guest Tek Interactive Entertainment Ltd., Calgary (CA)

(72) Inventors: John Thomas Welch, Willow Springs, MO (US); Gary L. Smith, Lindon, UT (US); Michael David Drews, Sandi, UT (US); Wael R. Midani, Farmington Hills, MI (US)

(73) Assignee: Guest Tek Interactive Entertainment Ltd., Calgary (CA)

( * ) Notice: Subject to any disclaimer, the term of this patent is extended or adjusted under 35 U.S.C. 154(b) by 202 days.

(21) Appl. No.: 16/563,382

(22) Filed: Sep. 6, 2019

(65) Prior Publication Data
US 2020/0008080 A1 Jan. 2, 2020

Related U.S. Application Data

(60) Division of application No. 14/505,577, filed on Oct. 3, 2014, now Pat. No. 10,448,259, which is a
(Continued)

(51) Int. Cl.
*H04W 16/18* (2009.01)
*H04W 88/08* (2009.01)
(Continued)

(52) U.S. Cl.
CPC ............ *H04W 16/18* (2013.01); *H04B 15/00* (2013.01); *H04W 48/02* (2013.01); *H04W 48/18* (2013.01);
(Continued)

(58) Field of Classification Search
None
See application file for complete search history.

(56) References Cited

U.S. PATENT DOCUMENTS 6,380,896 B1   4/2002   Berger et al.
7,039,417 B2   5/2006   Lyle et al.
(Continued)

FOREIGN PATENT DOCUMENTS

JP       2006135520 A      5/2006

OTHER PUBLICATIONS

Geier, Implementing Multiple SSIDs, Wi-Fi Planet Article of Apr. 24, 2003.
(Continued)

*Primary Examiner* — Mariela Vidal Carpio
(74) *Attorney, Agent, or Firm* — ATMAC Patent Services Ltd.; Andrew T. MacMillan

(57) ABSTRACT

A method of managing wireless access to a network performed by an access point includes storing a programmable response time for defining a zone of operation around the access point, receiving from a client device a request to associate with the access point, transmitting a probe to the client device, when a response to the probe is received, measuring a round trip time between transmission of the probe and receipt of the response, determining whether the client device's request to associate with the access point should be granted or denied by comparing the round trip time to the programmable response time, granting the request to associate in response to determining that the round trip time is less than the programmable response time, and denying the request to associate with the access point in response to determining that the round trip time is longer than the programmable response time.

20 Claims, 1 Drawing Sheet

Related U.S. Application Data continuation of application No. 13/013,659, filed on Jan. 25, 2011, now Pat. No. 8,855,065, which is a division of application No. 11/534,190, filed on Sep. 21, 2006, now abandoned.

(60) Provisional application No. 60/813,993, filed on Jun. 14, 2006.

(51) Int. Cl.
  *H04B 15/00* (2006.01)
  *H04W 48/18* (2009.01)
  *H04W 48/02* (2009.01)
  *H04B 7/10* (2017.01)
  *H04W 48/20* (2009.01)

(52) U.S. Cl.
  CPC .............. *H04W 88/08* (2013.01); *H04B 7/10* (2013.01); *H04W 48/20* (2013.01)

(56) References Cited

U.S. PATENT DOCUMENTS

| | | | |
|---|---|---|---|
| 7,174,170 B2 | 2/2007 | Steer et al. | |
| 7,216,365 B2 | 5/2007 | Bhagwat et al. | |
| 7,483,696 B1 | 1/2009 | Mitchell | |
| 7,593,730 B2 | 9/2009 | Khandelwal et al. | |
| 7,835,317 B2 | 11/2010 | Ahmavaara et al. | |
| 8,855,065 B2 | 10/2014 | Welch et al. | |
| 10,448,259 B2 | 10/2019 | Welch et al. | |
| 2001/0046865 A1 | 11/2001 | Hildebrand et al. | |
| 2002/0024955 A1* | 2/2002 | Suzuki | H04L 12/5601 370/395.2 |
| 2002/0193135 A1* | 12/2002 | Nakano | H04W 52/40 455/524 |
| 2003/0013435 A1* | 1/2003 | Kikuta | H04W 8/08 455/414.1 |
| 2003/0046343 A1* | 3/2003 | Krishnamurthy | H04L 67/125 709/203 |
| 2003/0061356 A1* | 3/2003 | Jason, Jr. | H04L 67/1002 709/227 |
| 2004/0002346 A1* | 1/2004 | Santhoff | H04B 17/309 455/456.1 |
| 2004/0028017 A1 | 2/2004 | Whitehill et al. | |
| 2004/0157613 A1 | 8/2004 | Steer et al. | |
| 2005/0037734 A1* | 2/2005 | Tanaka | H04W 12/06 455/411 |
| 2006/0128360 A1 | 6/2006 | Hibino | |
| 2006/0286977 A1 | 12/2006 | Khandelwal et al. | |
| 2007/0086372 A1* | 4/2007 | Lee | H04W 12/084 370/328 |
| 2007/0117558 A1 | 5/2007 | Balwani | |
| 2007/0147317 A1 | 6/2007 | Smith et al. | |
| 2007/0185814 A1* | 8/2007 | Boccon-Gibod | G06F 21/10 705/51 |
| 2007/0249323 A1 | 10/2007 | Lee et al. | |
| 2007/0291711 A1 | 12/2007 | Welch et al. | |
| 2008/0072289 A1* | 3/2008 | Aoki | H04L 63/1408 726/3 |
| 2011/0116452 A1 | 5/2011 | Welch et al. | |

OTHER PUBLICATIONS

Nonfinal Office Action dated Sep. 27, 2010, U.S. Appl. No. 11/534,190.
Final Office Action dated Nov. 17, 2009, U.S. Appl. No. 11/534,190.
Nonfinal Office Action dated Apr. 29, 2009, U.S. Appl. No. 11/534,190.
Written Opinion of the International Searching Authority for PCT/US07/71033, dated May 1, 2008.
Part 11: Wireless LAN Medium Access Control (MAC) and Physical Layer (PHY) specifications, Oct. 2005, IEEE, [retrieved from the internet URL<http://ieeexplore.ieee.org/servlet/opac?punumber=4040943>].

\* cited by examiner

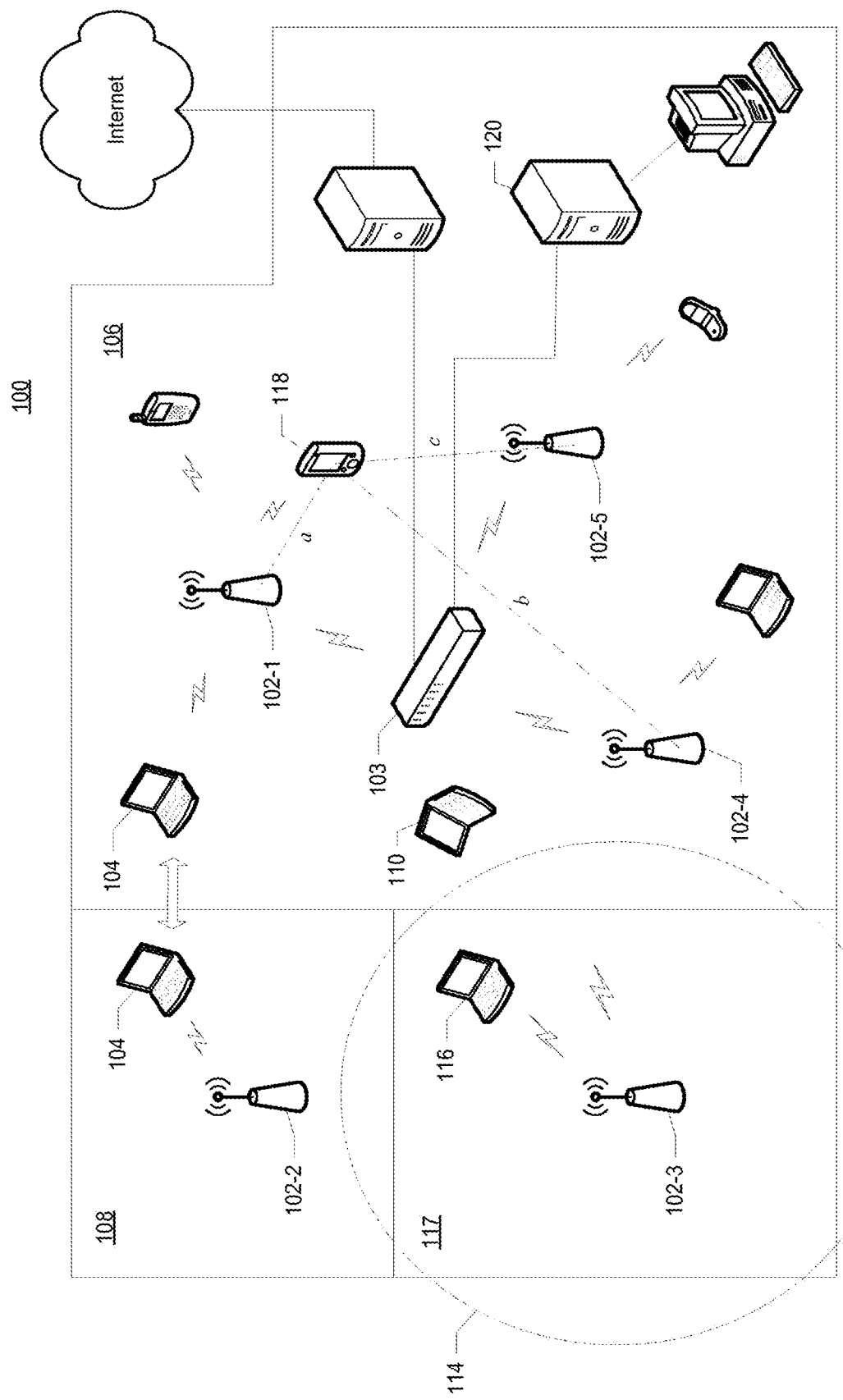

ACCESS POINT FOR MANAGING WIRELESS ACCESS TO A NETWORK ACCORDING TO A ZONE OF OPERATION ABOUT THE ACCESS POINT

CROSS-REFERENCE TO RELATED APPLICATIONS

This application is a divisional of U.S. patent application Ser. No. 14/505,577 filed Oct. 3, 2014; which is a continuation of U.S. patent application Ser. No. 13/013,659 filed Jan. 25, 2011; which is a division of U.S. patent application Ser. No. 11/534,190 filed Sep. 21, 2006; which claims the benefit of priority of U.S. Provisional Patent Application No. 60/813,993 filed on Jun. 14, 2006. All of the above referenced applications are incorporated herein by reference.

BACKGROUND OF THE INVENTION

(1) Field of the Invention

The present invention relates to wireless networks and, in particular, to a variety of techniques for the deployment and operation of access points in wireless networks to improve capacity and geographic isolation.

(2) Description of the Related Art

Wireless networks typically employ egress/access devices, commonly referred to as access points, which form points of presence for client radio devices. An access point may act alone in its function but is often deployed in an array or cellular structure with predictable and overlapping coverage from cell to cell. Client devices act as end-points for telemetry and data transferred to and from access points, or as processing points for the telemetry. In a conventional wireless network having multiple access points, a client device will typically associate with the access point for which it experiences the most favorable signal-to-noise ratio (SNR). The client will then attempt to remain associated with that access point for as long as possible (e.g., by tuning down the data transfer rate).

To avoid interference between adjacent access points, conventional wireless networks often employ different channels within the RF band of interest for different access points, e.g., channels 1, 6, and 11 in the RF band associated with IEEE 802.11, the set of standards relating to wireless local area networks. Careful control of the signal intensities for adjacent access points is also used to reduce the likelihood that the access points will interfere with each other.

In a wireless network based on IEEE 802.11 or similar technologies, it is desirable that client devices be able to roam seamlessly from one access point to another. In some applications, it is also desirable to provide and support a variety of functionalities including, for example, independent data paths, multiple data types, independent user permissions, and independent security protocols allowing or restricting access or content based on geographic or venue locations within an environment which may offer little restriction to radio frequency propagation. For example, it may be desirable to enable a user at a venue with the proper permissions to roam from a public area such as a hallway or lobby into a meeting room or convention area. In these new areas the user would then have access to data and permissions not allowed or available in the public area. The capability of restricting the area of influence or usability by defining strict geographic boundaries, i.e., geographic isolation, enhances or enables a wide variety of services such as, for example, E-911, Point location (i.e., a "You Are Here" service), billing by location, traffic management, data security, access control, etc.

Geographic isolation may be conventionally achieved by restricting the broadcast power of the transmitting access point or base station, and in some circumstances the transmitting power of the client devices. In some applications the Effective Isotropic Radiated Power (EIRP) of both the access point and client device may be restricted. This approach is highly effective in large open areas but breaks down in confined areas such as inside buildings or dense urban environments in which "canyon effects" tend to deduct signal.

In some applications, the attenuation presented by structures in the environment may not present a substantial barrier to signal propagation. This may be especially true, for example, in conference or office environments that may only be separated by glass, or thin, movable partitions. It is often not technically feasible to "dial down" the power of a transceiver to the point where it would continue to be useful in its intended area without transmitting beyond such barriers. In addition, reducing the transmission power of access points increases areas of shadow (or signal detected from other access points), while decreasing the ratio of signal to noise. These are both undesirable results in that they increase the likelihood that a client device might roam to an out-of-area access point. And even where this technique may be used successfully, it can be easily defeated by the use of relatively hi-gain antennas on client devices that enable reaching far beyond the intended area of geographic isolation.

Accurate determination of the location of client devices may also be used to achieve the goals associated with geographic isolation. That is, if the position of a client device is known within an environment, access to services may be controlled on that basis. Presently, wireless systems and devices rely on averaged signal strength from a known source point for location telemetry. The accuracy of the location can be improved upon, by a process known as triangulation. Triangulation is a process by which the location of a radio transmitter can be determined by measuring either the radial distance, or the direction, of the received signal from three different points. For example, the distance to a cell phone may be determined by measuring the relative time delays of the normal communications signal from the phone to three different base stations. Signal strength measurements in combination with triangulation have proven to be quite accurate in open environments. However, closed environments such as building interiors and dense urban areas present conditions which seriously degrade the efficacy of such techniques.

That is, the combination of reflection, refraction, multipath, and signal absorption in such environments form complex boundary conditions making position predictions based on signal strength and triangulation tricky and often inaccurate. Methods to correct for these effects involve highly complex modeling and mapping of signal levels in the environment. And unfortunately, this time consuming and expensive "correction" falls apart if even a small change occurs from the baseline mapping. These small changes include thing like a door opening or closing, a curtain being opened exposing a reflective pane of glass, or even something as innocuous as the variable flow of water in plumbing.

Another conventional approach to determining the location of client devices is accomplished using global positioning systems (GPS) technologies. Unfortunately, such technologies are not always reliable inside buildings or in dense urban environments in that the reach of GPS equipment is limited by the attenuation caused by surrounding structures. GPS solutions also involve the use of secondary equipment, increasing system costs and introducing an additional point of failure.

In view of the foregoing, it is desirable to provide improved techniques for deploying wireless access points, base stations and the like.

BRIEF SUMMARY OF THE INVENTION

According to a specific embodiment of the present invention a wireless network is provided which includes a plurality of access devices for enabling wireless access to the network by a plurality of client devices. A first one of the access devices is configured to inhibit association of the client devices with the first access device at data rates below a predetermined data rate, thereby creating a zone of operation outside of which the client devices are unlikely to associate with the first access device.

According to another specific embodiment, a wireless network is provided which includes a plurality of access devices for enabling wireless access to the network by a plurality of client devices. Each of the access devices is configured to transmit probes to the client devices and to receive responses from the client devices corresponding to the probes. A first one of the access devices is configured to inhibit association of the client devices with the first access device where receipt of the responses occurs more than a predetermined time period after transmission of the corresponding probes, thereby creating a zone of operation outside of which the client devices are unlikely to associate with the first access device.

According to yet another specific embodiment, a wireless network is provided which includes a plurality of access devices for enabling wireless access to the network by a plurality of client devices. Each of the access devices is configured to transmit probes to the client devices and to receive responses from the client devices corresponding to the probes. A first one of the access devices is configured to determine distances from the first access device to the client devices with reference to time periods associated with the probes and the corresponding responses. According to one such embodiment, the first access device is further configured to inhibit association of selected ones of the client devices with the first access device where the distances associated with the selected client devices are greater than a predetermined distance, thereby creating a zone of operation outside of which the client devices are unlikely to associate with the first access device.

According to another such embodiment, a first one of the distances is from the first access device to a first one of the client devices. Second and third ones of the access devices are configured to determine second and third distances from the second and third access devices, respectively, to the first client device. A first process operating in the network is operable to determine a position of the first client device with reference to the first, second, and third distances. According to an even more specific embodiment, the first process is further operable to facilitate association of the first client device with one of the access devices with reference to the position of the first client device.

According to a still further embodiment, a wireless network is provided which includes a plurality of access points for enabling wireless access to the network by a plurality of client devices. A first one of the access points is configured to facilitate association of the client devices with the first access point by broadcasting a first set of service set identifiers. The first access point is further configured to facilitate association of selected ones of the client devices in response to transmissions from the selected client devices identifying additional service set identifiers not included in the first set of service set identifiers.

According to yet a further specific embodiment, a wireless network is provided which includes a plurality of access devices for enabling wireless access to the network by a plurality of client devices. First ones of the access devices are configured to transmit signals having a first polarization. Second ones of the access devices are configured to transmit signals having a second polarization different from the first. The first and second access devices are deployed to mitigate friendly interference among the access devices. According to a more specific embodiment, the first and second polarizations are clockwise and counter-clockwise polarizations. According to another more specific embodiment, deployment of the first and second access devices results in a high-noise environment for the client devices such that each of the client devices tends to migrate to a nearest one of the first and second access devices.

According to yet a further specific embodiment, a system is disclosed which includes a plurality of access points for enabling wireless access to a network. First ones of the access points are configured to transmit and receive signals having a first polarization, and second ones of the access points are configured to transmit and receive signals having a second polarization different from the first polarization. The access points are configured with a wild card response to facilitate association of a client device for any service set identifier requested in transmissions from the client device. The client device is caused to associate with one of the access points and gain access to the network without a specific service set identifier requested by the client device being preprogrammed into the access points before the specific service set identifier is requested by the client device.

According to yet a further specific embodiment, a method of providing a wildcard service set identifier response is disclosed. The method is performed in a system comprising a plurality of access points enabling wireless access to a network. First ones of the access points are configured to transmit and receive signals having a first polarization, and second ones of the access points are configured to transmit and receive signals having a second polarization different from the first polarization. The method includes receiving at one or more of the access points a probe from a client device requesting a specific service set identifier, and responding to the client device by the one or more access points in order to facilitate wireless association of the client device to one of the one or more access points regardless of the specific service set identifier requested by the client device. The client device is caused to associate with the one of the one or more access points and gain access to the network without a specific service set identifier requested by the client device being preprogrammed into the access points before the specific service set identifier is requested by the client device.

According to yet a further specific embodiment, a wireless access point is disclosed including an antenna, a connection port providing wired communications with a network, one or more processors, and a storage device having software stored therein. When executed by the one or more processors the software causes the wireless access point to respond to a probe from a client device requesting a specific service set identifier according to a wildcard service set identifier response in order to facilitate wireless association of the client device with the wireless access point regardless of the specific service set identifier requested by the client device, and to provide the client device with wireless access to the network. In this way, the client device is enabled to associate with the wireless access point and receive access to the network without a specific service set identifier requested by the client device being preprogrammed into the wireless access point before the specific service set identifier is requested by the client device.

According to yet a further specific embodiment, an access point is disclosed including an antenna, one or more processors, and a storage device having software instructions stored therein. When executed by the one or more processors the software instructions cause the one or more processors to store a programmable response time for defining a zone of operation around the access point, receive from a client device a request to associate with the access point, transmit a probe to the client device in response to receiving the request, monitor incoming packets to determine whether the client device responds to the probe, receive a response to the probe from the client device, measure a round trip time between transmission of the probe and receipt of the response to the probe, determine whether the round trip time is longer than the programmable response time, allow the client device to associate with the access point in response to determining that the round trip time is less than the programmable response time, and deny the request to associate with the access point in response to determining that the round trip time is longer than the programmable response time.

According to yet a further specific embodiment, a method of managing wireless access to a network is disclosed—the method performed by an access point coupled to network. The method comprises: storing a programmable response time for defining a zone of operation around the access point, receiving from a client device a request to associate with the access point, transmitting a probe to the client device in response to receiving the request, monitoring incoming packets to determine whether the client device responds to the probe, receiving a response to the probe from the client device, measuring a round trip time between transmission of the probe and receipt of the response to the probe, determining whether the round trip time is longer than the programmable response time, allowing the client device to associate with the access point in response to determining that the round trip time is less than the programmable response time, and denying the request to associate with the access point in response to determining that the round trip time is longer than the programmable response time.

According to yet a further specific embodiment, a non-transitory processor-readable medium is disclosed. The non-transitory processor readable medium comprises a plurality of processor-executable instructions that when executed by one or more processors cause the one or more processors to perform a plurality of steps including: storing a programmable response time for defining a zone of operation around the access point, receiving from a client device a request to associate with the access point, transmitting a probe to the client device in response to receiving the request, monitoring incoming packets to determine whether the client device responds to the probe, receiving a response to the probe from the client device, measuring a round trip time between transmission of the probe and receipt of the response to the probe, determining whether the round trip time is longer than the programmable response time, allowing the client device to associate with the access point in response to determining that the round trip time is less than the programmable response time, and denying the request to associate with the access point in response to determining that the round trip time is longer than the programmable response time.

A further understanding of the nature and advantages of the present invention may be realized by reference to the remaining portions of the specification and the drawings.

BRIEF DESCRIPTION OF THE DRAWINGS

FIG. 1 is a simplified network diagram of an exemplary wireless local area network in which embodiments of the present invention may be implemented.

DETAILED DESCRIPTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well-known features may not have been described in detail to avoid unnecessarily obscuring the invention.

FIG. 1 is a simplified network diagram of an exemplary wireless local area network 100 in which embodiments of the present invention may be implemented. Wireless access points 102 in conjunction with switch 103 provide access to network 100 to a variety of client devices. It should be noted at the outset that the equipment and network configuration shown merely represent one example of the wide variety of environments in which the invention may be practiced. For example, wireless access points 102 may be implemented according to any of IEEE 802.11b, 802.11g, 802.11a, 802.16, etc., and may represent products provided by suppliers such as, for example, Colubris Networks of Waltham, Mass., or Cisco Systems of San Jose, Calif. Additionally, the connection between access points 102 and the network (as represented by switch 103 which may itself represent one or more of a wide variety of switches and routers) is represented as wireless, but may be wired. In general, the techniques described herein are more widely applicable and should not be limited to the network configurations, standards, or vendors referred to herein.

In addition, the various functionalities described herein may be implemented in a variety of ways. For example, various aspects of these functionalities may be implemented in hardware, firmware, or software associated with the various devices in a wireless network. These devices include wireless access points or base stations, associated computing devices (e.g., servers and switches), and, in some cases, the client devices operating in the network. The functionalities may be performed or controlled by a single device or may be performed in a distributed manner by more than one device in the network. Thus, although exemplary embodiments described herein may refer to particular approaches to implementing the various functionalities of the invention, those of skill in the art will understand that these references are not intended to limit the invention.

It should also be noted that, as used herein, the term "client device" refers to any of a wide variety of devices which operate in a wireless network including, for example, any type of wireless computing device (e.g., laptops, handheld devices, etc.), any type of wireless telecommunications device (e.g., cell phones, messaging clients, etc.), inventory devices (e.g., point-of-sale, bar code scanners, etc.), or devices performing functions as peripherals to standard or common digital or analog systems.

According to various embodiments of the invention, techniques are provided which may be used individually or in various combinations to implement functionalities typically associated with geographic isolation in complex wireless environments, e.g., providing different levels of access or service in well-defined geographic zones of operation. In contrast with conventional approaches which attempt to mitigate the effects of noisy environments, some of the embodiments of the invention actually take advantage of low signal-to-noise ratios and signal distortion to achieve these functionalities. For example, according to some embodiments, signal interference and/or signal distortion may cause client devices to disassociate from access points or base stations in predictable and intended ways even in the presence of very high signal levels.

In systems employing IEEE 802.11 or similar wireless technologies, each session for packet transfer, including the connection data rate, is negotiated between the client and the wireless access point. That is, the client and the access point negotiate the data rate on a packet-by-packet basis. Therefore, according to a specific embodiment of the invention, restricting the data rate at which a client is allowed to associate controls the usable sphere of influence or operational zone of the access point.

As will be understood, it is difficult for a client to maintain a data rate of 11 Mbps (802.11b) or 54 Mbps (802.11a, 802.11g) connecting to an access point through an obstruction; even a window or thin partition. As the signal passes through a barrier it is distorted due to reflection and refraction from the barrier regardless of the strength of the signal. These effects are further exacerbated by the "noise" associated with other nearby access points. Thus, by enforcing a minimum data transfer rate, when the client leaves a hotel conference room, for example, it cannot "turn down" the data transfer rate to stay associated with the access point in the conference room and so will disconnect as desired.

According to some embodiments, the ability to enforce a minimum data transfer rate may be enabled using existing access point features which provide control over the data transfer rate. For example, some access points may be configured to set a maximum data rate for QoS purposes, i.e., to keep some devices from starving other devices. Such a feature may also facilitate compatibility with certain client devices that only handle specific data rates (i.e., as opposed to all the rates specified by the standards). As will be understood, this minimum data rate may be adjusted so that the usable area is appropriate for the room configuration or the desired geographic zone size.

An example may be illustrative. A client device 104 may initially be associated with an access point 102-1 with a strong signal in the public area 106 of a hotel. The client 104 then wanders into another area (e.g., a private meeting room 108 with different security, permissions, and access rules) while still associated to the public area access point 102-1. Because of the noise and/or distortion caused by the physical barriers (even low attenuation barriers) and competing access points (e.g., lost node scenario), the client device 104 breaks its connection with the public area access point 102-1 within a few packets (regardless of its data rate or, to a large margin, link strength) and probes for available access points for its service set identifier (SSID). When an access point receives the probe, it advertises its availability, and subsequently the access point and client device initiate the procedures for association and authentication.

Due to its closer proximity, the private meeting area access point 102-2 (i.e., the access point or one of a group of access points intended for that private meeting area) is the first to respond (i.e., the near/far scenario). The client then associates to the closer (i.e., the private meeting area) access point 102-2 and becomes party to the permissions, restrictions, security, and benefits associated with that geographic operational zone. Some time later the client device 104 may physically leave the area by simply passing through an exit. Then, due to the signal attenuation and distortions caused by the environment's boundary conditions (e.g., physical barriers and reflective/multipath conditions) the client 104 is incapable of sustaining the predetermined connection data rate (e.g., 11 or 54 Mb under 802.11b and 802.11a/g respectively). And because the private area access point 102-2 is configured to refuse any lower data rates, the client is forced back to the public area access point 102-1.

According to another specific embodiment of the invention, the operational zone of an access point is controlled with reference to the amount of time required for round trip communications between the access point and associated client devices. Everything between an access point and a client device involves some form of a handshake. Often this takes the form of a probe and response, e.g., an acknowledgment (ACK) request to and an ACK response from the client device and is handled on the PHY (tertiary) level of the device technology. As dictated by the laws of physics relating to signal propagation, the round trip time of these handshakes, e.g., the time required for an ACK response from the client, represents the distance from the access point. Therefore, according to a specific embodiment of the invention, where the client is further than some distance from the access point, e.g., the ACK response takes longer than some programmable time period, the client is not allowed to associate (or continue to associate) with the access point.

According to a specific embodiment, the ACK response time of the access point (e.g., 102-3) is manipulated such that client devices (e.g., device 110) outside of a desired range 114 are unable to respond to an ACK from the access point 102-3 within the response time, while client devices inside range 114 (e.g., device 116) can. This approach makes it possible to significantly limit the range of an access point (i.e., the access point will not wait long enough for a distant client's response to reach it), while still providing a high enough RF signal to account for shadows or weak spots within the intended coverage area of the access point (e.g., meeting room 117).

According to yet another specific embodiment, the operational zone of an access point is again defined with reference to the amount of time required for round trip communications between the access point and associated client devices. According to this approach, the response time is used to determine the distance to the client (as opposed to simply setting the acceptable response time to prevent associations). This distance is then used to make decisions such as, for example, determining whether or not a connection will be allowed or maintained. In IEEE 802.11 systems, the Logical Link Control (LLC) and Media Access Control (MAC) layers employ at least five distribution services which can be exploited for such information. The simplest is the wait state which is controllable and can be monitored at the PHY level. The advantage of this approach is that it can be implemented and/or manipulated at the lowest network level, therefore requiring less processing time. However, any probe and response may be employed for this purpose.

A numerical example may be illustrative. When a TCP packet is transmitted in an IEEE 802.11 network, the receiving device sends an ACK 212.18 µs after receiving the packet. This represents the time required by the receiving device to process an 18 byte preamble (144 µs), a 6 byte header (48 µs), 14 bytes of ACK data (10.18 µs), and interface space (10 µs). If the round trip time as measured by the transmitting device is 213.3 µs, this represents a signal propagation time to the receiver and back of 01.12 µs (1120 ns). Because the distance between the transmitting and receiving devices is the measurement needed, the travel time is divided by two 1120 ns/2=560 ns. Because radio waves propagate about 11.8 inches in 1 ns, the distance between the devices is approximately 560×11.8/12=550.7 feet. An access point may therefore be set, for example, to deny a client access or to terminate a connection if the client is over 400 feet away (i.e., if round trip time for the probe/ACK is longer than 212.99 µs after the probe is sent). The client is then forced to associate with an alternate access point. According to some implementations, reflections due to barriers will add small travel time to the wave front and may need to be accounted for.

According to some embodiments, the distances a, b, and c of a client 118 from multiple access points (e.g., 102-1, 102-4, and 102-5) may be determined. These distances may then be employed (e.g., by an agent (e.g., server 120) in communication with the multiple access points) to determine a position of the client (as opposed to a linear distance from a particular access point) so that a decision may be made based on the client's position as to which AP the client should associate with, and/or the types of services to be made available to the client. The determination of position may be done to varying degrees of precision and may be accomplished, for example, using any of a wide variety of triangulation algorithms known in the art.

As will be appreciated with reference to the above-described embodiments, a wireless network may be constructed according to the invention in which multiple access points or base stations operate in well-defined geographic zones of operation. However, in some situations, circumstances beyond the control of the network provider may interfere with such carefully configured environments. For example, a network configured in accordance with the invention may be deployed in a hotel, but a wireless hotspot in an adjacent coffee house might flood the carefully constructed network with its transmissions. Because FCC regulations prohibit the jamming of such signals, it is likely that devices associated with hotel guests may request connection to the SSID associated with the coffee house access point instead of one of the access points in the hotel.

One approach to this problem would be to configure the hotel's access points to respond to a client's response to a probe from the coffee house access point. However, current top-of-the-line access points only allow specification of limited number of SSIDs. Given that SSIDs are specified with up to 32 alphanumeric characters, such an approach would undesirably force the hotel to use the SSIDs of the adjacent businesses rather than the ones they would like to use. Therefore, according to a specific embodiment, wireless access points implemented in accordance with the invention are enabled to accept connections from client devices even where the requested SSID is not one of the ones specified for those access points. This "wild card" response to any SSID probe makes it virtually impossible for any client device to associate with an access point out of the desired area. That is, the access points within the desired area will respond to probes from the client devices before the access points outside of the desired area, and the client devices will associate preferentially with the access point that responds first. This will effectively circumvent any attempt to associate with the access point outside of the desired area and will increase the number of devices and network traffic for the access points inside the desired area. According to more specific embodiments, the foregoing approach may be employed in combination with one or more geographic area restriction techniques to inhibit devices outside of the desired area from associating with access points within the desired area.

As mentioned above, the approaches to geographic isolation and client location described herein may be used individually or in various combinations to achieve the desired zone of operation and/or related functionality. For example, it is clear from FIG. 1 that the range 114 defined around access point 102-3 extends into the adjacent meeting room 108 and the public area 106. That is, the geographic zone defined by the single technique relating to device response time defines a spherical region around access point 102-3 which extends beyond the intended coverage area, i.e., meeting room 117. However, if this technique is combined with the technique in which a minimum or specific data rate is enforced (e.g., as described above with reference to meeting room 108), this could have the effect of eliminating the portions of the spherical zone represented by range 114 outside of room 117. That is, because client devices outside of room 117 will not be able to sustain the data rate required by access point 102-3 (e.g., because of the intervening walls), they will not be able to associate with that access point even if they are within range 114.

In another example, the technique described above in which the position of client device 118 is determined may be combined with the response time technique to improve the reliability with which the geographic isolation and related functionality may be effected. That is, in addition to determining which access point with which client 118 should associate, the association would only be allowed if client 118 was able to respond to the selected access point within the programmed response time.

As will be understood, the foregoing combinations are described by way of example. A variety of other combinations of the described techniques and their equivalents and variants will be apparent to those of skill in the art and are therefore included within the scope of the invention.

Due to the limited capacity of and high demands placed on wireless access points, it is often necessary to provide additional access points in some applications in order to better serve the volume of client devices. However, a problem arises relating to interference between and among closely spaced access points (often referred to as "friendly" system noise). This interference can result in protection mechanisms (e.g., clear to send/clear to receive cycles, or carrier sense multiple access) being enabled which, in turn, cause the network to slow down. In addition, such interference can compromise data integrity, causing packet retries and thereby further reducing system performance.

As mentioned above, current practice is to select different channels for closely spaced access points to minimize interference (e.g., use of channels 1, 6, and 11 in the 802.11b/g band are often recommended by manufacturers for this purpose because they do not overlap). However, such an approach is not adequate for the access point densities required in some applications. Therefore, according to various embodiments of the present invention, the number and/or density of access points is increased by the reduction of friendly system noise to the access points while allowing a high level of friendly system to the clients through the use of mixed polarizations.

Transmitted radio signals reflect off objects creating a condition called "multi-path" in which a signal follows several paths to the receiver. On long point-to-point radio links stratification of the atmosphere can create multiple paths by refracting the signal. Because of their longer path lengths, these reflected or refracted signals take longer to arrive at the receiver where they can interfere with the main signal. It is common for wireless systems to combine polarization diversity with spatial diversity to take advantage of the multi-path condition. This requires the installation of two antennas separated vertically or horizontally. Vertical separation works well for longer free-space line-of-sight links, while horizontal separation works best for partially obstructed or non-line-of-sight links. The signals received by both antennas are combined to enhance the quality of the signal where multi-path exists. Mixed polarization has been a common practice since the 1940s and has been used as a form of diversity in order to clear up signals, or in some cases to co-locate like systems on a single structure for point-to-point applications or for radar.

According to specific embodiments of the invention, adjacent or closely spaced access points or base stations in a wireless network are configured with different polarizations to enable denser placement of these devices and to thereby increase the capacity of the system. According to a specific embodiment, opposing circular polarizations (e.g., clockwise and counter-clockwise) are employed. In such an implementation, transmissions from an antenna with a clockwise polarization have a theoretical rejection ratio approaching 29 dB (and a practical rejection ratio of 20 dB) when received by an antenna using a counter-clockwise polarization. Embodiments of the invention take advantage of this rejection ratio to reduce the likelihood of friendly interference at the access point, thus increasing the number of access points that can be deployed in a given environment.

As mentioned above, client devices make the decision to handoff from one access point to another based on the signal-to-noise ratio they experience, thus allowing them to select the most appropriate access point in a cluttered environment. As such, a reduction of noise as experienced by the client device in such an environment is undesirable. Fortunately, the mixed polarization approach of the present invention does not reduce the noise at the client. In some cases, such embodiments result in a high noise environment for the client devices which, in turn, advantageously causes the client devices to migrate to closer or less populated access points or base stations.

While the invention has been particularly shown and described with reference to specific embodiments thereof, it will be understood by those skilled in the art that changes in the form and details of the disclosed embodiments may be made without departing from the spirit or scope of the invention. For example, the mixed polarization technique described above could be combined with any of the geographic isolation and client location techniques described herein to implement a wireless network with high capacity and well-defined zones of operation.

And despite references to a hotel environment, it will be understood that the techniques described herein may be applied in a wide variety of wireless network environments. For example, wireless networks in manufacturing and warehouse facilities could be improved using any of the techniques described herein. In addition, the various techniques of the present invention may be applied to wireless networks implemented with technologies outside of the IEEE 802.11 family of standards, e.g., wireless telecommunications networks.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method of managing wireless access to a network, the method performed by an access point coupled to the network, the method comprising:
   storing a programmable response time for defining a zone of operation around the access point;
   receiving from a client device a request to associate with the access point, wherein the request to associate is an attempt by the client device to establish a link between the access point and the client device according to an IEEE 802.11 protocol;
   transmitting a probe to the client device in response to receiving the request;
   monitoring incoming packets to determine whether the client device responds to the probe;
   when a response to the probe is received from the client device, measuring a round trip time between transmission of the probe and receipt of the response to the probe;
   determining whether the round trip time is longer than the programmable response time;
   allowing the client device to associate with the access point in response to determining that the round trip time is less than the programmable response time;
   denying the request to associate with the access point in response to determining that the round trip time is longer than the programmable response time; and
   transmitting data between the client device and the network via the access point only while the client device is associated with the access point.

2. The method of claim 1, wherein the probe is an acknowledgement (ACK) request and the response is an ACK response.

3. The method of claim 2, further comprising sending the probe and detecting the response to the probe at a physical network layer of the access point.

4. The method of claim 1, further comprising
   transmitting a second probe to the client device after allowing the client device to associate with the access point;
   receiving from the client device a response to the second probe;
   measuring a second round trip time between transmission of the second probe and receipt of the response to the second probe;
   determining whether the second round trip time is longer than the programmable response time;

allowing the client device to continue to associate with the access point in response to determining that the second round trip time is less than the programmable response time;

not allowing the client device to continue to associate with the access point in response to determining that the second round trip time is longer than the programmable response time.

5. The method of claim 1, further comprising manipulating the programmable response time according to a desired geographical zone of operation around the access point.

6. The method of claim 5, further comprising calculating the programmable response time according to a predetermined distance representing the desired geographical zone of operation around the access point, a round-trip signal propagation time given the predetermined distance, and a processing time of the client device given a packet size of the probe as transmitted by the access point.

7. The method of claim 1, wherein, when no response to the probe is received from the client device within the programmable response time, denying the request to associate with the access point.

8. The method of claim 1, further comprising converting the round trip time into a distance between the client device and the access point by taking into account a processing time of the client device given a packet size of the probe as transmitted by the access point.

9. The method of claim 8, further comprising sending the distance to an agent on the network.

10. A non-transitory processor-readable medium comprising a plurality of processor-executable instructions that when executed by one or more processors cause the one or more processors to perform steps of:

storing a programmable response time for defining a zone of operation around an access point;

receiving from a client device a request to associate with the access point, wherein the request to associate is an attempt by the client device to establish a link between the access point and the client device according to an IEEE 802.11 protocol;

transmitting a probe to the client device in response to receiving the request;

monitoring incoming packets to determine whether the client device responds to the probe;

when a response to the probe is received from the client device, measuring a round trip time between transmission of the probe and receipt of the response to the probe;

determining whether the round trip time is longer than the programmable response time;

allowing the client device to associate with the access point in response to determining that the round trip time is less than the programmable response time;

denying the request to associate with the access point in response to determining that the round trip time is longer than the programmable response time; and transmitting data between the client device and a network via the access point only while the client device is associated with the access point.

11. An access point for managing wireless access to a network, the access point comprising:

an antenna;

one or more processors; and a storage device having a plurality of software instructions stored therein that when executed by the one or more processors cause the one or more processors to:

store a programmable response time for defining a zone of operation around the access point;

receive from a client device a request to associate with the access point, wherein the request to associate is an attempt by the client device to establish a link between the access point and the client device according to an IEEE 802.11 protocol;

transmit a probe to the client device in response to receiving the request;

monitor incoming packets to determine whether the client device responds to the probe;

receive a response to the probe from the client device;

measure a round trip time between transmission of the probe and receipt of the response to the probe;

determine whether the round trip time is longer than the programmable response time;

allow the client device to associate with the access point in response to determining that the round trip time is less than the programmable response time;

deny the request to associate with the access point in response to determining that the round trip time is longer than the programmable response time; and transmit data between the client device and the network only while the client device is associated with the access point.

12. The access point of claim 11, wherein the probe is an acknowledgement (ACK) request and the response is an ACK response.

13. The access point of claim 11, wherein sending the probe and detecting the response to the probe is performed at a physical network layer of the access point.

14. The access point of claim 11, wherein, by executing the software instructions, the one or more processors are further configured to:

transmit a second probe to the client device after allowing the client device to associate with the access point;

receive from the client device a response to the second probe;

measure a second round trip time between transmission of the second probe and receipt of the response to the second probe;

determine whether the second round trip time is longer than the programmable response time;

allow the client device to continue to associate with the access point in response to determining that the second round trip time is less than the programmable response time;

not allow the client device to continue to associate with the access point in response to determining that the second round trip time is longer than the programmable response time.

15. The access point of claim 11, wherein, by executing the software instructions, the one or more processors are further configured to manipulate the programmable response time according to a desired geographical zone of operation around the access point.

16. The access point of claim 15, wherein, by executing the software instructions, the one or more processors are further configured to calculate the programmable response time according to a predetermined distance representing the desired geographical zone of operation around the access point, a round-trip signal propagation time given the predetermined distance, and a processing time of the client device given a packet size of the probe as transmitted by the access point.

17. The access point of claim 11, wherein, when no response to the probe is received from the client device within the programmable response time, the one or more processors are configured to deny the request to associate with the access point.

18. The access point of claim 11, wherein, by executing the software instructions, the one or more processors are further configured to convert the round trip time into a distance between the client device and the access point by taking into account a processing time of the client device given a packet size of the probe as transmitted by the access point.

19. The access point of claim 18, wherein, by executing the software instructions, the one or more processors are further configured to send the distance to an agent on the network.

20. A system comprising a plurality of access points each as set forth in the access point of claim 11, wherein at least two of the access points have different programmable response times.

* * * * *